United States Patent [19]

Inbody

[11] 4,234,236
[45] Nov. 18, 1980

[54] TWO PIECE WHEEL FOR A CENTERLINE STEERING WHEEL ASSEMBLY

[75] Inventor: Melvin R. Inbody, Findlay, Ohio

[73] Assignee: The Centerline Steering Safety Axle Corporation, Findlay, Ohio

[21] Appl. No.: 949,684

[22] Filed: Oct. 10, 1978

Related U.S. Application Data

[60] Division of Ser. No. 836,673, Sep. 26, 1977, Pat. No. 4,159,832, which is a continuation of Ser. No. 638,069, Dec. 5, 1975, abandoned, which is a continuation-in-part of Ser. No. 492,438, Jul. 29, 1974, Pat. No. 3,963,260.

[51] Int. Cl.³ ............................................. B60B 23/10
[52] U.S. Cl. ................................. 301/6 W; 301/6 E; 301/35 R; 301/63 D; 188/18 A; 152/411
[58] Field of Search .................. 301/6 R, 6 A, 6 CS, 301/6W, 6 E, 63 DS, 63 D, 35 R; 152/404, 405, 411, 412, DIG. 10; 280/96.3; 188/18 R, 18 A

[56] References Cited

U.S. PATENT DOCUMENTS

| | | | |
|---|---|---|---|
| 1,406,759 | 2/1922 | Putnam | 301/63 D |
| 2,552,082 | 5/1951 | Ash | 301/6 W |
| 2,955,677 | 10/1960 | Jones | 301/63 DS X |
| 3,880,219 | 4/1975 | Mitchell | 301/63 D X |

FOREIGN PATENT DOCUMENTS

| | | | |
|---|---|---|---|
| 473966 | 8/1952 | Italy | 152/405 |
| 620353 | 3/1949 | United Kingdom | 152/405 |

*Primary Examiner*—Charles A. Marmor
*Attorney, Agent, or Firm*—Laverne D. Geiger

[57] ABSTRACT

A two piece wheel has an inner tire rim half with an inwardly directed annular flange and an annular groove receiving an O-ring seal, an outer tire rim half has an annular chamfer at its inner edge fitting over and compressing the O-ring seal, a wheel spider secured to the inside of the outer rim has a matching inwardly directed annular flange, an annular reinforcing brake attaching flange is adjacent the rim and spider flanges, and studs and nuts fasten the three flanges together.

6 Claims, 13 Drawing Figures

TWO PIECE WHEEL FOR A CENTERLINE STEERING WHEEL ASSEMBLY

This is a Division of Ser. No. 836,673, filed Sept. 26, 1977, now U.S. Pat. No. 4,159,823 dated July 3, 1979 which is a continuation of Ser. No. 638,069, filed Dec. 5, 1975, which is a continuation-in-part of Ser. No. 492,438, filed July 29, 1974 now U.S. Pat. No. 3,963,260 dated June 15, 1976.

BACKGROUND, SUMMARY, AND OBJECTS OF THE INVENTION

It is desirable to provide automotive vehicles with disc type brakes which comprise a flat disc-like rotor attached to the vehicle wheel and having a pair of hydraulic, air or vacuum actuated pistons which clamp a segment of the rotor thereto for applying a braking action to the wheel. Difficulties have been encountered with brakes of this type when applied to the dirigible wheels of vehicles because out of balance conditions of the wheels cause vibrations of the rotors and the brake shoe mechanisms resulting in noise and deterioration of the hydraulic shoe actuating mechanism.

The present application discloses a centerline steering wheel assembly including a two-piece wheel and a disc brake. The brake rotor is attached to both parts of the wheel. This not only provides a more stable and reliable braking system but also offers a simplified means for changing tires. The wheel is fixed to a spindle rotatable in a hub. The speedometer drive gear assembly is directly connected to a rotating spindle.

An object of the invention is to provide a new and improved dirigible wheel and disc type brake mechanism for all surface vehicles, as for example, passenger automoboiles, trucks, buses, tractors or aircraft landing gear, in which the steering axis of the wheel lies in the plane of the disc brake rotor on the wheel.

Another object is to provide a two-piece vehicle wheel and disc type brake mechanism.

A further object is to provide a vehicle wheel mounted on a spindle which is rotatable in a hub, and a speedometer drive gear assembly attached to the rotating spindle to rotate a speedometer shaft.

A still further object is to provide an improved ball joint assembly for mounting a centerline steering wheel assembly to the upper and lower support arms of a surface vehicle.

Other objects, features and advantages of the invention will be readily apparent from the following description of a preferred embodiment thereof, taken in conjunction with the accompanying drawing, although variations and modifications may be effected without departing from the spirit and scope of the novel concepts of the disclosure.

DESCRIPTION OF PREFERRED EMBODIMENT OF THE INVENTION

Figure 1:
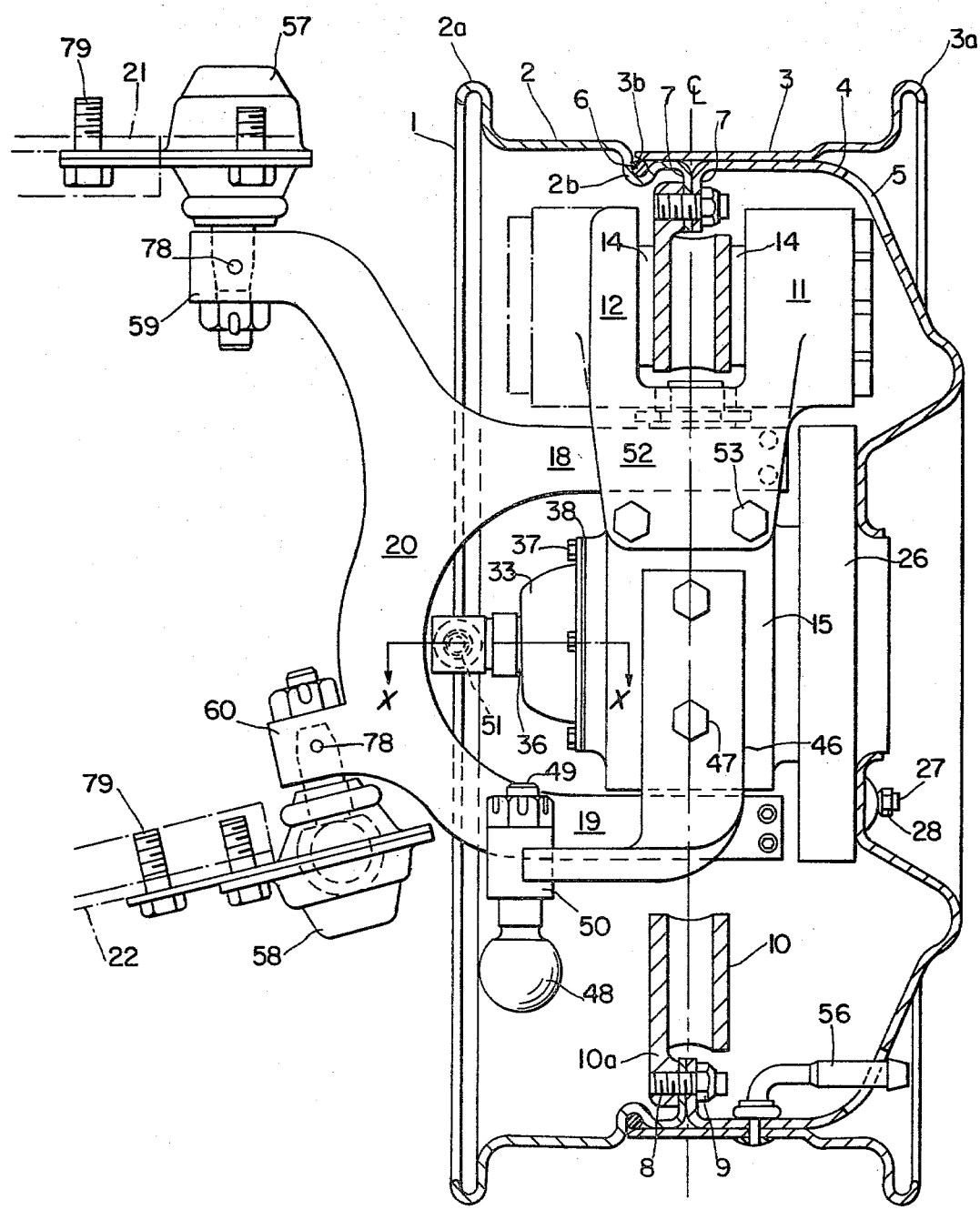
FIG. 1 is a rear elevational view of a front wheel assembly of a surface vehicle, with the wheel being shown in section, the section being taken on a vertical plane thru the center of the wheel and transversely thereof.

In the preferred embodiment of the invention illustrated in FIGS. 1–13 I have shown a two-piece dirigible wheel 1. This is one of the two front wheels of a surface vehicle, not shown, and it is to be understood that the other wheel is identical in construction to the wheel 1 and, to avoid repetition, the other wheel is shown only in FIG. 2. Wheel 1 comprises inner tire rim half 2 and outer tire rim half 3. Wheel spider 4 is secured to the outer tire rim, as for example, by welding, and has one or more openings 5 for both ventilation and access to the inside. Rubber O-ring seal 6 is located in an annular groove 2b in the inner tire rim half. This groove is located at the inner edge of the outer tire rim half, which has an annular chamfer 3b to fit around and over the O-ring in order to compress the O-ring seal and form an air tight seal for the wheel. Inwardly directed annular mating flanges 7 are located at the respective ends of inner tire rim half 2 and spider 4. Threaded rotor studs 8 and rotor stud nuts 9 secure the two halves of the wheel together. If desired, locating dowel pins, not shown, may be used for centering the flanges with respect to each other. A tool may be inserted through openings 5 to remove the stud nuts. The annular mating flanges also provide a significant increase in the strength factor needed on the vertical and horizontal centerlines of the wheel to withstand the severe wheel and brake torque forces.

Figure 2:
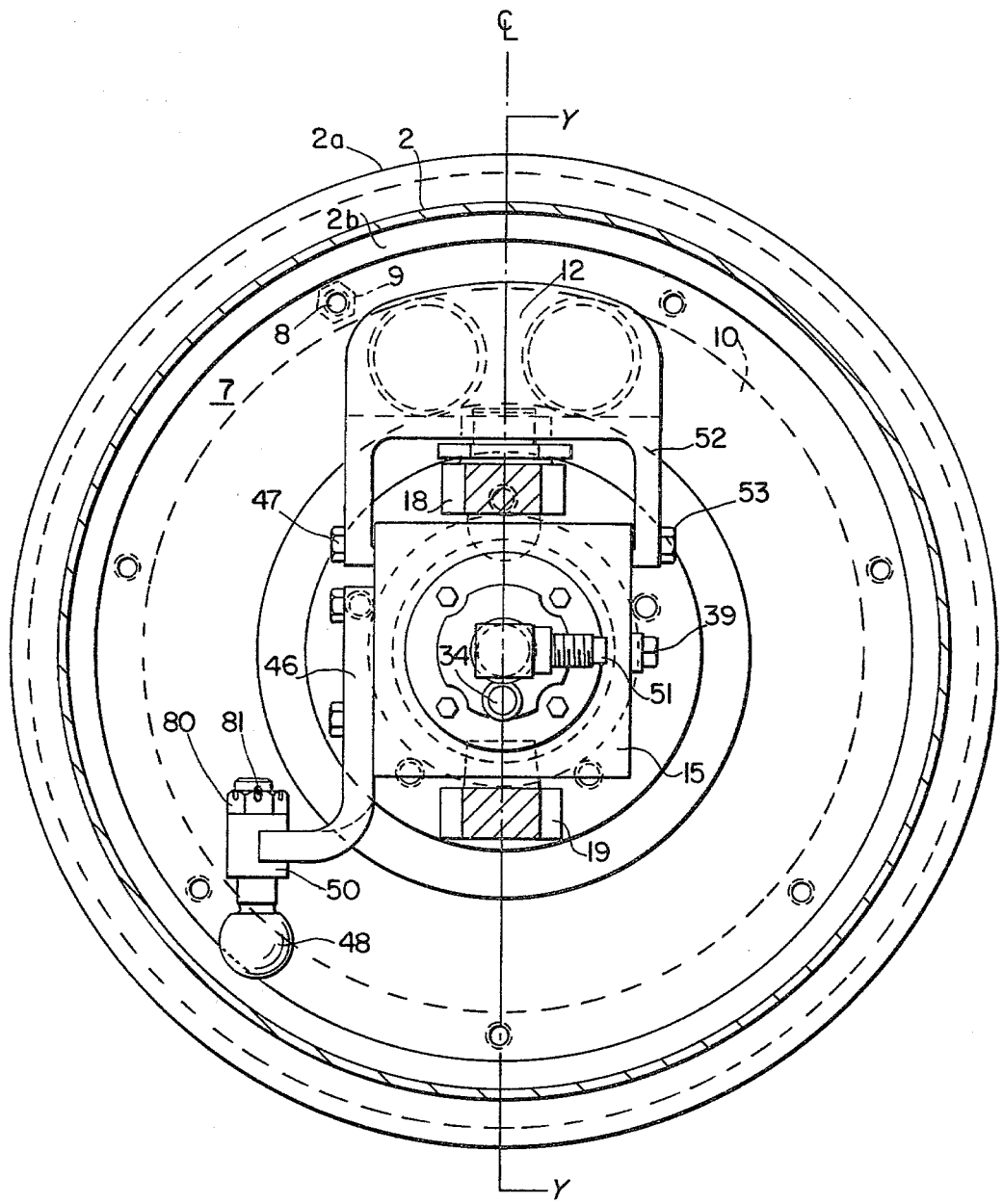
FIG. 2 is an inside elevational view of the opposite, or left hand wheel assembly with the wheel in section.

FIGS. 1 and 2 show how the brake rotor disc 10 has an annular attaching flange 10a and is attached to the wheel by rotor studs 8 and nuts 9. The vertical planes of the wheel and of the rotor disc, which are equidistant from and parallel to the planes of the wheel rims 2a, 3a, are coincident. A brake caliper assembly completes the brake system. Caliper housing 11 provides a housing or chamber for a hydraulic piston on one or both sides of brake rotor disc 10. As shown in full lines in FIG. 1 hydraulic pressure is applied to only one side of brake rotor disc 10. Fixed opposing bracket 12, along with the hydraulic piston, permits braking pressure to be applied to both sides of the rotor disc. One or more brake surface pads or shoes 14 are held in a self-floating cavity provided for in the caliper housing. Opposing surface frictional pad 14 is maintained in a self-floating condition in bracket 12. Either a "left hand" or a "right hand"

construction may be used. The construction is essentially the same and in the interest of clarity this showing has been used. Likewise, a hydraulic piston and caliper housing may be used on both sides, thereby substituting a hydraulic piston for an opposing bracket.

Figures 12, 13:
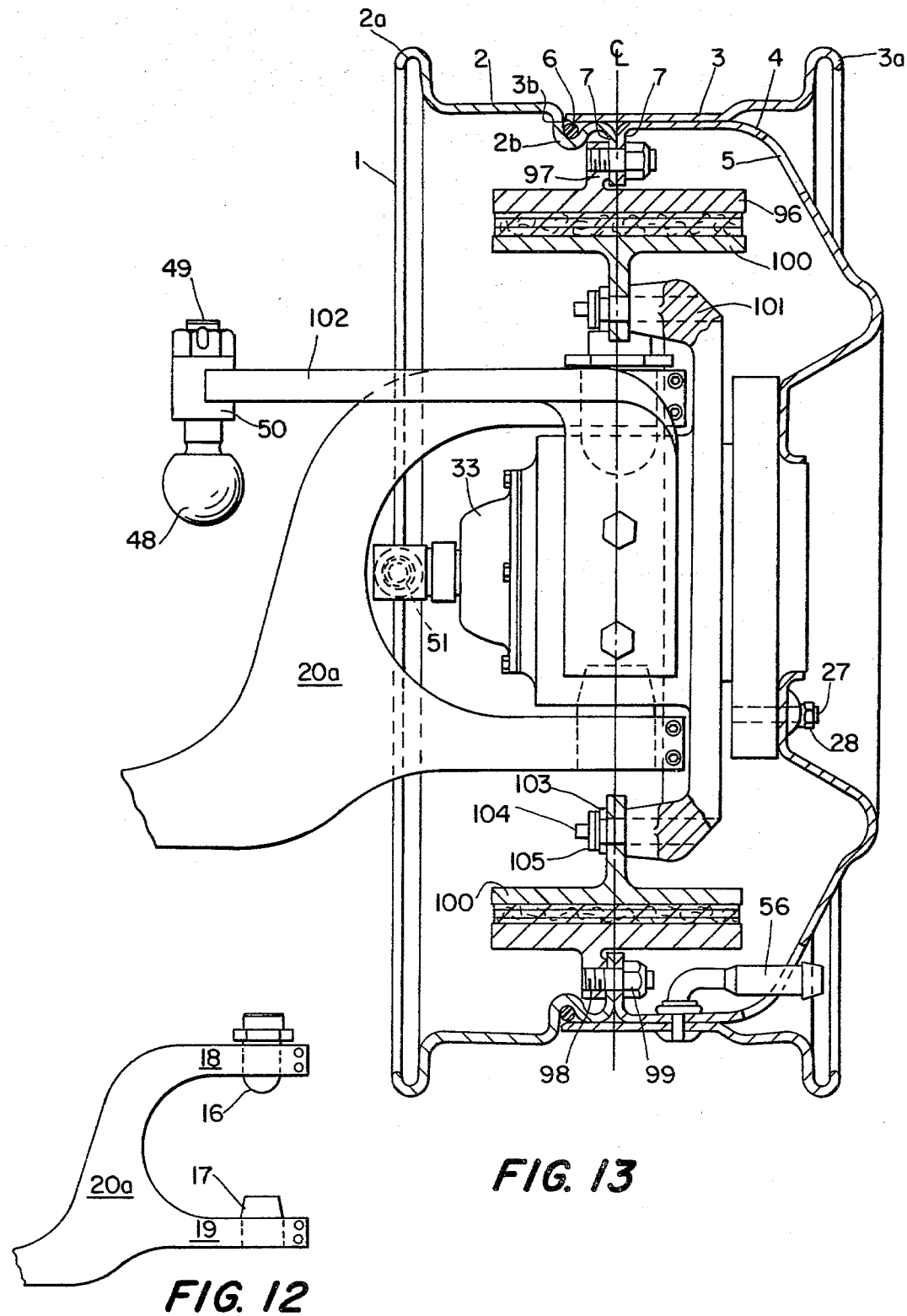
FIG. 12 is a view of an alternate form of yoke.
FIG. 13 is a view similar to FIG. 1 but showing a drum type brake system and the alternate form of yoke shown in FIG. 12.

In the centerline steering system the wheel and spindle 24 are held together and the spindle rotates inside a hub 15. In steering the vehicle the wheel, brake rotor, spindle and hub turn together as a unit about a vertical axis which is coincident with the vertical center line of the wheel and brake rotor disc. This center line is indicated by broken line CL. The hub is supported by upper trunnion pin 16 and lower trunnion pin 17. The trunnion pins are threaded into upper and lower arms 18, 19 of a yoke member 20. In FIG. 12 an alternate yoke member 20a is shown. The yoke member 20 is connected to conventional upper and lower support arms 21, 22 of a surface vehicle, not shown, by upper and lower ball studs 23, 23.

Spindle 24 has a circular central boss 25 projecting from the hub and an annular flange 26 extending radially from the boss. The wheel 1 is mounted by securing spider 4 on annular flange 26 by means of spindle studs 27 and taper nuts 28 or wheel bolts. The spindle is supported for rotation in the hub 15 on tapered wheel bearings 29, 30. The lower cavity inside the hub provides oil sump 31 to lubricate the wheel bearings. A spring loaded mechanical oil seal 32 is pressed into the undercut surface in annular flange 26 and overlies the machined neck portion 35 of the hub. Hubcap 33 closes the opposite, or inner, end of the hub. Inspection glass 34 in the hubcap provides a visual check of the oil level inside the hub. The hubcap also has threaded element 36 secured to it in alignment with the spindle. The purpose of element 36 will be described later. The hubcap may be secured to the hub by bolts 37 and sealed with gasket 38. A breather plug 39 (FIG. 2) is threaded to the mid section of the hub and serves as an internal pressure relief valve and oil filler plug.

Figure 3:
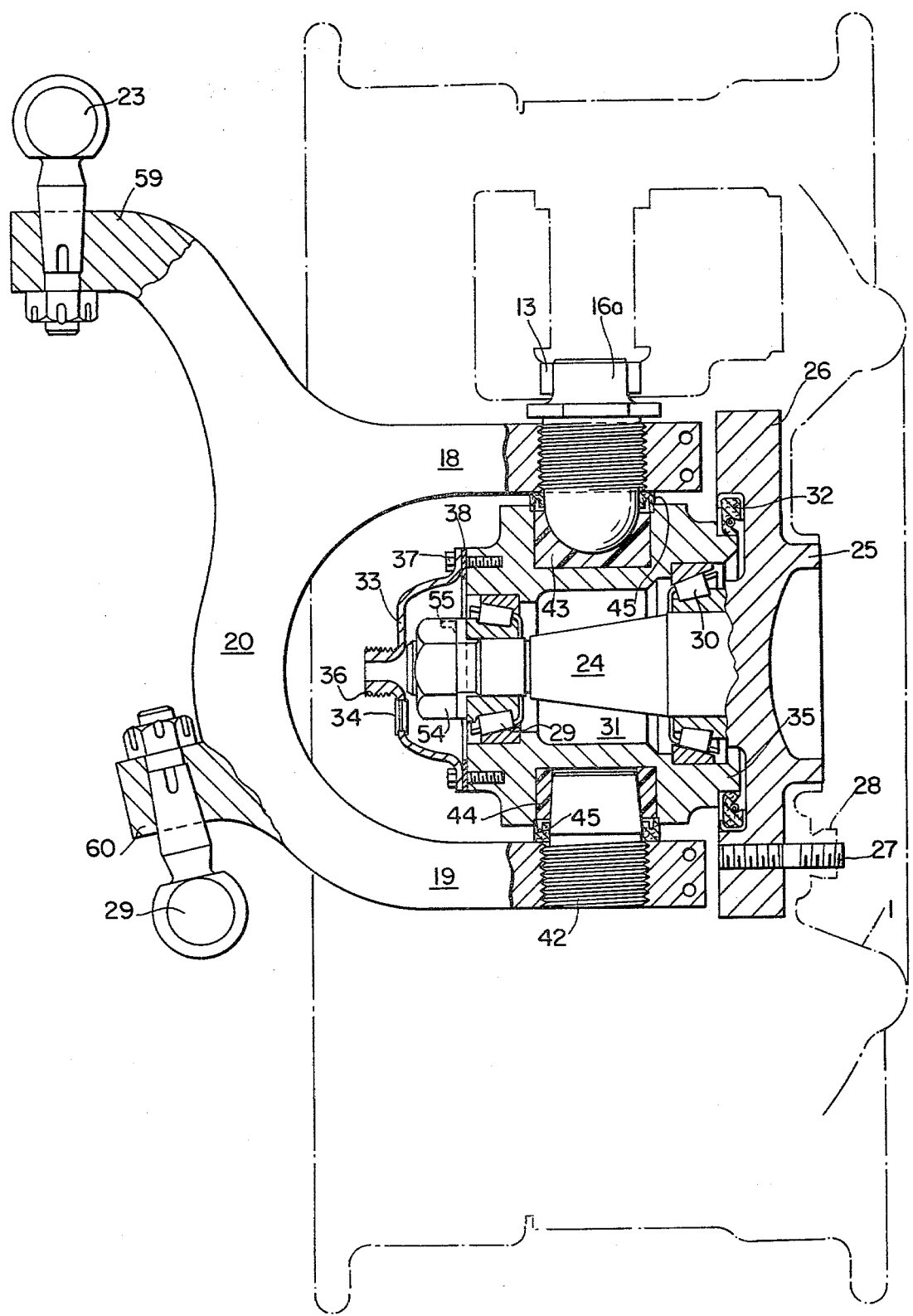
FIG. 3 is an elevational view similar to FIG. 1 but with the hub, spindle, and yoke ends partly in section along Y—Y, FIG. 2, and the wheel and caliper housing in outline.
Figure 4:
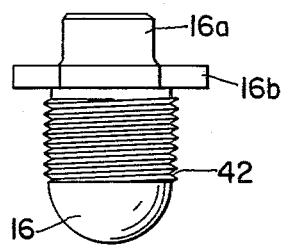
FIG. 4 is a detail of the upper trunnion pin anchor swivel stud.
Figure 6:
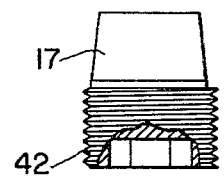
FIG. 6 is a detail, partly in section, of the lower tapered trunnion pin.
Figure 8:
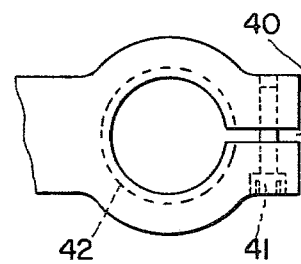
FIG. 8 is a plan view of the ends of the yoke arms which are located above and below the hub.
Figure 5:
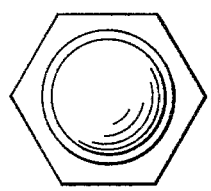
FIG. 5 is a bottom view of the trunnion pin shown in FIG. 4.
Figure 7:
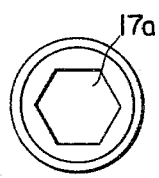
FIG. 7 is a bottom view of the trunnion pin shown in FIG. 6.

Since the hub turns only when vehicle steering takes place it is supported by upper and lower trunnion pins 16, 17 which are threaded into the upper and lower yoke arms 18, 19 respectively. FIG. 8 shows how the ends of the yoke arms are slotted at 40 to provide an opening for a pinch type trunnion pin lock by means of socket head lock bolt 41. Threads 42 in the yoke arms receive the respective threaded trunnion pins FIG. 4, and FIG. 6. The slotted end 40 provides a relief opening engagement surrounding both trunnion pins for easy assembly and disassembly. This slotted or split type yoke is particularly useful in trucks and other heavy vehicles. FIG. 3 shows the trunnion pins nested in their respective bushings. The shapes of the bushings and trunnion pins are important to the proper functioning of the device. The upper trunnion pin cooperates with two separate load bearing members, namely the hub 15 and upper yoke arm 18. Additionally as shown in FIGS. 3 and 4, the upper portion 16a of trunnion pin 16 acts as a swivel stud to support brake caliper housing 11, while the lower hemi-spherical ball end supports the full static and dynamic load forces applied to bushing 43 recessed in the hub. Hexagonal collar 16b is a means of turning the trunnion pin to adjust clearance between 16 and bushing 43 and has an upper flat surface which may support the brake caliper housing. The lower trunnion pin 17 is tapered and fits up into its bushing 44. The taper is important to align opposing bearing surfaces to stabilize the hub. The taper end is self-aligning and shares the greater part of lateral thrust forces, but it also compensates for any wear clearances which may occur on the upper companion pin 16 or bushing 43. Flexible mechanical seals 45 prevent outside contamination into the upper and lower trunnion pin and bushing areas. FIGS. 6 and 7 show hexagonal recess 17a for receiving a socket wrench to adjust trunnion pin 17 to bushing 44. The trunnion pins are treated to be permanently lubricated. Space between yoke arm 19 (FIG. 1) and rotor 10 is needed in order to fit caliper 11 over pin 16a.

The trunnion construction described above permits the steering of the vehicle by a direct connection of the vehicle steering rod or system (not shown) with the hub. Steering arm bracket 46 is attached to the side of the hub, as with bolts 47. Steering arm ball 48 has a stud portion 49 extending through a hole in a boss 50 at the end of the arm bracket. The stud is anchored by castellated lock nut 80 and cotter pin 81.

A caliper and bracket assembly, comprising supports 52, is secured to or integral with caliper housing 11 and bracket 12. Supports 52 are secured to the hub as by bolts 53. These supports, together with the swivel stud portion 16a of upper trunnion pin 16, which fits into bushing 13, serve to additionally anchor the caliper housing 11 and bracket 12 to hub 15. The bushing 13 is a serviceable or replacement bushing required for bearing the caliper housing. The continued swiveling and brake torque action will require this bushing to be replaced on periodic brake rebuild intervals. It may be made of any suitable material, as for example, bronze or sintered metals. Thus the caliper portion of the brake system and the vehicle steering system are both anchored to the hub. The wheel 1 and the brake rotor are secured to the spindle. The inner end of the spindle is secured for rotation inside the center of the hub by means of spindle nut 54 and spindle lock washer 55. The wheel is fitted with tire inflator valve 56.

The assembly and disassembly of the centerline tire and rim is simple, easy and safe. The two tire rim halves may be put together from the opposite sides of the tire. However, in the case of heavy trucks and buses the conventional mounting of tires on wheels is cumbersome, hazardous and costly. The conventional tire bead safety lock ring must be properly seated against the outer rim radius to lock the tire bead outside radius to the lock ring. If, during the tire inflation period, the bead, lock ring and rim surfaces are not closely engaged, the lock ring, under incoming tire pressure, may blow the ring from the rim with intense velocity causing injury or possible death to anyone standing nearby. The centerline two-piece wheel eliminates the need to carry an extra spare wheel for a quick interchange. A spare tire is concealed in a small space thereby reducing the weight and space required for a conventional wheel-tire spare assembly. The two-piece wheel design is also interchangeable with rear wheels. Recent transporation laws have been passed by Congress mandating safety highway improvements on all types of surface vehicles. Steering safety shares a significant importance toward reducing highway accidents. This involves wheels, brakes and front end suspensions. It is recognized that two-piece wheels have been commercially produced for the aircraft industry. But the wheel disclosed herein is not in the same context, and with its brake rotor disc, it rotates together with a live spindle as part of the centerline steering system.

The wheel and brake system described thus far is applicable to surface vehicles of all dimensions such as for example passenger vehicles, large trucks, buses, aircraft landing gear and tractors. The ball studs 23, 23 are particularly adapted to use with passenger vehicles, in part because of the universal design and structure of standard present day passenger vehicles. Trucks and other large vehicles, because of the enormous weights they carry, often have front end suspension designs which are different from those of passenger vehicles. FIG. 12 shows an alternate form of yoke construction wherein yoke 20a also has yoke arms 18, 19 into which trunnion pins 16, 17 are threaded. But in this alternate form the other end of the yoke is integrally or rigidly attached to the vehicle frame (not shown) rather than by ball studs 23, 23.

Figure 10:
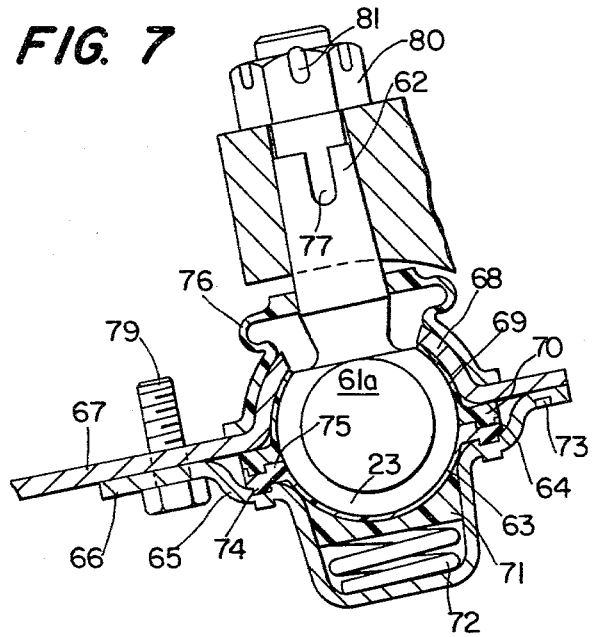
FIG. 10 is a sectional view of the centerline steering lower ball joint assembly structure.
Figure 11:
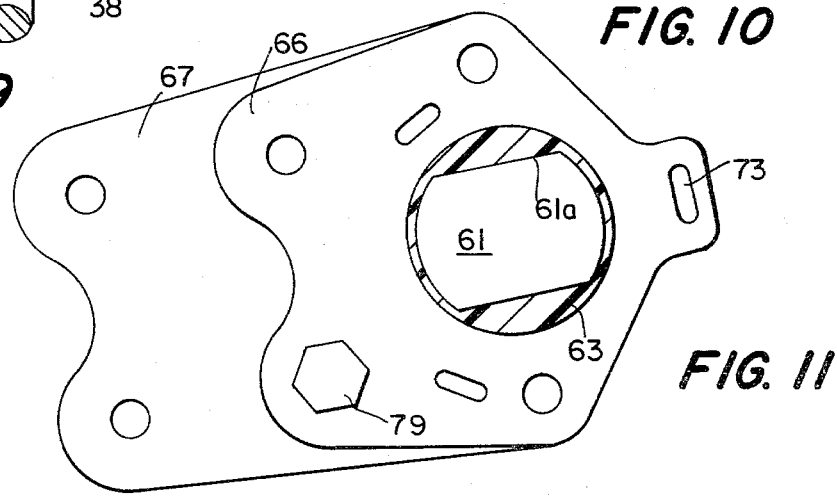
FIG. 11 is a bottom view of the mounting structure of a ball joint assembly, with a bushing shown in section.

The centerline structure for connecting the yoke member 20 to the conventional upper and lower support arm 21, 22 of a surface vehicle is shown in FIGS. 1, 10 and 11. The upper ball joint assembly 57 and lower ball joint assembly 58 are similar and will be described together. FIG. 10 applies to both. Upper ball joint yoke boss end 59 and lower ball joint yoke boss end 60 with their upper and lower ball studs 23, 23 provide the basic connections for attaching the centerline wheel, brake and hub assembly to the conventional upper and lower support arms of a vehicle, which in turn are interconnected to the vehicle frame and spring suspension members. The axes of the upper ball stud and upper ball joint yoke boss are vertical and coincident. The axes of the lower ball stud and lower ball joint yoke boss intersect the above mentioned upper axes. The inclined lower ball axes are essential in order to fit the centerline construction herein described to the conventional vehicle support arms. Such conventional support arms result from the use of the usual kingpin construction and its need for camber and caster adjustment.

The centerline steering system does not itself require compound angular adjustments; however, the mounting structure disclosed herein is essential to fit the conventionl support arms end thereby providing an inexpensive changeover to the centerline system. Ball joint assemblies 57, 58 are significantly different from what one might assume to be typical ball joints. The ball studs comprise a spherical segment or flat sided ball 61, whose flat sides 61a, 61a are equidistant from the center of the sphere, and a tapered shank portion 62. The flat sides of the spherical segment prevent any rotational movement when seated in the flat sided cavity of lower bushing 63. Freedom of movement is limited to a vertical plane. The significance of this construction lies in the rotational locking device which it provides when the centerline steering structure is mounted to the upper and lower support arms provided by the vehicle manufacturer. The conventional steering system requires spherical ball joints constituting the hinged members for the wheels to swing into and out of turns. Since the centerline wheel pivot axis is on the true centerline of the hub I have devised this method to provide an inexpensive conversion to the centerline structure.

It must be remembered that the flat sided ball (spherical segment) prevents turning of the yoke in a forward or backward direction but the curved surface permits motion up and down in an arcd jounce motion for good rideability and suspension floatation.

The lower bushing 63 is shown in section in FIG. 11 and the ball 61 and shank 62 are shown in full view. Lower bushing 63 has an annular flange 64 which supports the bushing in lower hemispherical shell cage 65. The shell cage is integral with flat plate 66. Above and in direct contact with plate 66 is upper flat plate 67, which also has a hemispherical shell cage 68 which is opposite shell cage 65. Upper bushing 69 has an annular flange 70. Bushing 69 is fitted to the inside of shell cage 68 with annular flange 70 extending below plate 67. The bushing 69 and shell cage 68 are pressed into the surface of ball 61 aligning the flat surfaces thereof. Lower hemispherical shell cage 65 contains bushing 63, support bushing 71, and tension spring 72. Shell cage 65, with its bushings and spring in position, is located over the ball and the two shell cages held together and secured to outer and inner snaplock 73 as for example by plug welding. Snaplock 74 provides an internal lock to prevent the bushing from rotating in the shell cage. A closure gap 75 located between annular bearing flanges 64 and 70 provides lip spacing when tension spring 72 applies pressure against support bushing 71.

The ball joint assembly is partially enclosed by a molded rubber sealing boot 76. The upper and lower shoulders surrounding the shank portion 62 and overlying plate 67 are shaped to size.

Tapered shank 62 has a slot 77 wherein a lock pin 78 is driven to prevent any rotational movement in the yoke boss end. Any rotation at this point or within the confines of the joint would affect the centerline alignment.

The upper and lower yoke boss ends 59, 60 must be positioned to match the ball joint centerline prescribed by the vehicle manufactures. Caster shims may be used between plate 67 and support arm 22, if a greater degree of caster is required.

Upper and lower ball joints 57, 58 are identical in construction but their position extending upwardly or downwardly is entirely dependent upon the direction of load on the yoke boss ends. Different automobile manufacturers have different constructions in this respect, as is well known in the art. However, the tension spring 72 location must always be mounted on the non-loaded ball socket half to compensate for wear occurring on its companion half. Support bushing 71 may be enlarged to replace tension spring 72 when it is located on the loaded side of the ball. Castellated lock nut 80 is threaded on the end of shank portion 62 to secure the ball joint assembly to its boss end. Cotter pin 81 is provided to secure the lock nut.

The two-piece wheel construction with the brake rotor disc provides ample spacing for the caliper connection to the hub with the upper portion of the trunnion pin 16 acting as a swivel stud. In light of the clearances provided it is now possible to increase the number of braking pistons and pads required for heavier braking requirements without a costly modification as would be required in the conventional wheel and disc brake assembly.

The centerline wheel and brake construction overcomes several problems; problems inherent in either the conventional disc or drum brake design; more specifically, problems relating to brake action time when input pressure is applied to actuate braking members. The conventional system causes a twisting action on the axle and brake members after the brakes are applied. This in turn causes slow recovery after the brake is released. The reaction time or moment for said members to return to the original shapes causes brake sluggishness or slow retardation. These problems, for the most part, have been difficult to meet under the braking standards set forth by the U.S. Department of Transportation, especially on heavy trucks and buses. Several new expedients have been designed to meet these standards; however, these devices have failed to effectively solve the on-going problems.

It will be virtually impossible to solve the conventional steering and brake problems because of the sprung mass loading forces hinged outwardly from the conventional kingpin or ball joint pivot axes. The ultimate solution is based on my past experience in combination with the centerline steering and brake construction.

The structure, herein disclosed, solves the reactionary brake problems—which is an incontestable claim—the axle wheel and brake alignment places all parts immediately over a true vertical plane and the forces are equally disposed over the wheel pivot axis. In addition, the brake rotor disc 10, with its attaching flange 10a secured to the annular mating flanges 7, 7, adds strength and rigidity to the wheel and thus increased responsiveness to the entire brake system.

Figure 9:
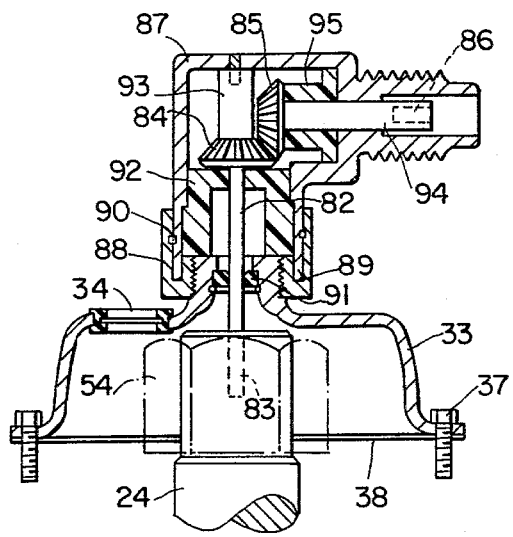
FIG. 9 is a view, partly in section, along line X—X of FIG. 1, showing the front wheel speedometer drive gear assembly.

Added to the many advantages described hereinabove for the centerline hub, spindle and brake system is the case with which a rotating spindle and hubcap may be modified to directly connect the rotating spindle to an inexpensive speedometer drive mechanism 51 for all surface vehicles. This is due to the fact that the centerline construction is based upon a vehicle wheel spindle rotating in a hub. The details of the drive gear assembly are shown in FIG. 9.

Hubcap 33 is a mounting support member for the drive gear assembly since it is anchored to the hub by bolts 37, with a sealing gasket 38 therebetween. Spindle nut 54 secures the spindle to the hub in cooperation with tapered wheel bearings 29,30. The input speedometer drive shaft 82 is fixed to the spindle, preferably by being non-circular in cross section and mating with corresponding non-circular hole 83 in the spindle. Bevel gear 84 is fixed to the end of shaft 82 and meshes with bevel gear 85. Bevel gear 85 is fixed to output shaft 86, which may be interconnected to a flexible speedometer drive cable, not shown, and thereby coupled to a speedometer dial located on the instrument panel inside the vehicle.

The drive gear housing 87 hermetically seals all internal components. Sealing swivel nut 88 overlies housing shank 89, and a snap ring 90 is interposed, locking the swivel nut and housing shank. The snap ring provides a bearing surface for the swivel nut as well as sealing the internal parts from outside contamination.

The swivel nut 88 is threaded onto element 36 to a tight sealing fit, thereby mounting the complete assembly on the hubcap. Seal 91 includes a washer and is swaged into element 36. Spacer block 92 is pressed into the inner housing cavity and provides a secondary bearing surface for input shaft 82. Spacer 93 may be secured to the housing, as by a pin, to provide further support for the gear and shaft. The output shaft 86 is integral with gear 85 and has a non-circular hole 94 for coupling the speedometer cable, not shown. Spacer block 95 is pressed into the housing cavity to provide a bearing member supporting bevel gear 85 and output shaft 86.

The centerline spindle and speedometer gear train is very inexpensive compared to the expensive complex gearing mechanism now commonly used on conventional steering and wheel mounted axles. Conventional design requires a mounting plate attached to the inner surface of the wheel and therein connected to a series of driving reduction gears overlying common supporting members which are interconnected to a shaft extending through a backing plate and inwardly connected to an adapter connected to the flexible speedometer drive cable.

The centerline structure eliminates the need for numerous additional parts required to provide the same 1 to 1 ratio required for a speedometer reading in M.P.H. The centerline drive is compact and hermetically sealed. The gears, shafts and spacers are all treated to be self-lubricating. The output gear shaft is designed on a 90° angle to project the flexible drive cable rearwardly toward the instrument panel. It is recognized that there will be a bending radius in the flexible cable when the front wheel is turned in both directions. This radius falls within the tolerances set forth by the cable manufacturer.

The two-piece wheel, as stated hereinabove, is also advantageous for use on heavy vehicles such as trucks, buses and tractors. Because of the heavy loads involve it is sometimes desired to have the yoke member directly anchored on the vehicle frame or vehicle axle. In such construction the ball joints are eliminated as shown in FIGS. 12 and 13.

Since the two-piece wheel provides such ample space inside the wheel, and the mating flanges 7, 7 are located at the central plane of the wheel and tire, it may also be used a drum type brake system, as shown in FIG. 13.

Annular brake shoe drum 96 has one or more flanges 97. The flange 97 is fastened to mating flanges 7, 7 by threaded brake drum stud 98 and brake drum stud nut 99. Brake shoes 100, 100 are supported by shoe guide pin 104 on brake shoe anchor 101 which is secured to the hub or is integral with the hub. Shoe guide pin 104 is held in place by C-washer 103 and spring washer 105. The brake shoe actuating mechanism is not shown. In FIG. 13 the steering arm bracket 102 extends upwardly rather than downwardly, as illustrated in FIGS. 1 and 2, to show an alternative construction which may be selected for use with some manufacture's steering arm. The wheel is of two-piece construction similar to that described hereinabove.

I claim:

1. A two piece dirigible wheel assembly for a surface vehicle having a rotatable wheel support, said wheel assembly comprising: an inner rim half having an annular groove; an outer rim half overlying a portion of the inner rim half and having an undercut chamfer at its inner edge; an elastic O-ring seal seated in said annular groove and said chamfer overlying the O-ring; a spider extending inside and along the inner periphery of the outer rim half and permanently and directly secured to said outer rim half for attaching the wheel to the rotatable wheel support; an annular radially directed flange at the outer end of the inner tire rim half presenting an outwardly directed surface; an annular radially directed mating flange at the inner end of said spider presenting an inwardly directed surface; an annular element adjacent the flanges; and means for releasably fastening said mating flanges and said annular element together.

2. A dirigible wheel assembly as recited in claim 1 in combination with an annular brake element integral with said annular element and extending radially inward and wherein said annular element serves as a brake flange; said annular brake element having one or more braking surfaces and lying entirely inside the confines of said wheel.

3. A dirigible wheel assembly as defined in claim 2 wherein said annular brake element comprises a brake rotor disc.

4. A dirigible wheel assembly as defined in claim 2 wherein said annual brake element comprises a brake drum.

5. A dirigible wheel assembly as recited in claim 2 wherein the outwardly directed surface of the annular radially directed flange of the inner tire rim half lies in a plane substantially equally spaced from the inner and outer edges, respectively, of the inner and outer tire rim halfs, and wherein the inwardly directed surface of the said mating flange of said spider lies in said plane.

6. A dirigible wheel assembly as defined in claim 2 wherein said spider is provided with access openings for allowing access to the inside of the wheel and for providing ventilation for the wheel.

* * * * *